United States Patent
Lee et al.

(10) Patent No.: US 9,036,096 B2
(45) Date of Patent: May 19, 2015

(54) HEAD MOUNTED DISPLAY AND METHOD FOR DISPLAYING CONTENTS USING THE SAME

(71) Applicants: Joong Ho Lee, Goyang-si (KR); Ji Hyung Park, Seoul (KR)

(72) Inventors: Joong Ho Lee, Goyang-si (KR); Ji Hyung Park, Seoul (KR)

(73) Assignee: Korea Institute of Science and Technology, Seoul (KR)

(*) Notice: Subject to any disclaimer, the term of this patent is extended or adjusted under 35 U.S.C. 154(b) by 33 days.

(21) Appl. No.: 13/744,546

(22) Filed: Jan. 18, 2013

(65) Prior Publication Data

US 2014/0071025 A1    Mar. 13, 2014

(30) Foreign Application Priority Data

Sep. 10, 2012 (KR) .................. 10-2012-0099887

(51) Int. Cl.
G02B 27/01 (2006.01)
G02B 27/10 (2006.01)
G02B 27/12 (2006.01)

(52) U.S. Cl.
CPC ........ *G02B 27/0172* (2013.01); *G02B 27/1066* (2013.01); *G02B 27/123* (2013.01); *G02B 2027/0123* (2013.01)

(58) Field of Classification Search
CPC .......... G02B 3/004; G02B 6/08; G02B 27/02; G09G 3/003; G09B 9/307; G06F 3/011; A42B 3/042
USPC .............................. 345/211; 349/96; 359/626; 348/E13.011
See application file for complete search history.

(56) References Cited

U.S. PATENT DOCUMENTS

| | | | |
|---|---|---|---|
| 4,406,532 A | | 9/1983 | Howlett |
| 5,650,876 A | * | 7/1997 | Davies et al. ................. 359/622 |
| 5,751,383 A | * | 5/1998 | Yamanaka ...................... 349/13 |
| 6,215,593 B1 | * | 4/2001 | Bruce ............................ 359/619 |
| 8,047,660 B2 | * | 11/2011 | Penn et al. ..................... 353/102 |
| 8,179,362 B2 | * | 5/2012 | Brigham et al. .............. 345/102 |
| 2010/0018644 A1 | * | 1/2010 | Sacks et al. ................... 156/277 |
| 2014/0153102 A1 | * | 6/2014 | Chang ........................... 359/630 |

FOREIGN PATENT DOCUMENTS

| | | |
|---|---|---|
| JP | 10-170860 A | 6/1998 |
| JP | 2957070 B2 | 7/1999 |
| JP | 2009-69364 A | 4/2009 |
| KR | 10-2006-0031377 | 4/2006 |
| KR | 10-2007-0104960 | 10/2007 |
| KR | 10-2012-0088754 | 8/2012 |
| WO | WO 2011/062591 | 5/2011 |

* cited by examiner

*Primary Examiner* — Ariel Balaoing
*Assistant Examiner* — Chineyere Wills-Burns
(74) *Attorney, Agent, or Firm* — NSIP Law

(57) ABSTRACT

A head mounted display and a method of displaying a content using the head mounted display are disclosed. The head mounted display is disclosed which includes: a display unit displaying a content; and a first lens unit configured by a set of lens elements that refract the content displayed on the display unit in an eyeball direction.

9 Claims, 5 Drawing Sheets

HEAD MOUNTED DISPLAY AND METHOD FOR DISPLAYING CONTENTS USING THE SAME

CROSS-REFERENCE TO RELATED APPLICATION

This application claims priority from and the benefit under 35 USC 119(a) of Korean Patent Application No. 10-2012-0099887, filed on Sep. 10, 2012, which is incorporated by reference for all purposes as if fully set forth herein.

BACKGROUND

1. Field

Exemplary embodiments of the present invention relate to a head mounted display and a method for displaying contents using the head mounted display. More particularly, the embodiments relate to a head mounted display that is lightweight and supports high resolution and a method for displaying contents using the head mounted display.

2. Discussion of the Background

Recently, the demand for personal display devices increases in accordance with the trend of a decrease in the size of display elements, and display devices are developed which provide the same effect as that of a case where an image is seen with a large screen being disposed at a predetermined distance while an image output from small image display elements is magnified using an optical system, and the eyes are allowed to see a resultant virtual image.

Since most of such devices has a form being worn on the head using a method similar to that of glasses, the devices are called head mounted displays (hereinafter, referred to as HMD). Generally, HMDs are video display systems that form a predetermined image on a single eye or both eyes at a position close to the eyes of a user by using a high-precision optical device included inside thereof.

In order to show such device characteristics, the HMDs are designed such that the focal distance is formed to be very short and have been mainly used for the purpose of implementation of videos of military, medical, and educational video systems, virtual reality systems for entertaining, and the like. However, recently, the HMDs are developed in various forms and are spread in a large quantity in accordance with the trend of an increase in the quality of hardware such as a home or portable audio/video (AV) system (for example, a DVD system, a home theater, or the like) and a wired or wireless computer, and accordingly, the utilization and the use value of the HMDs increase.

A general HMD configures various optical mechanisms using a reflector and a high magnification lens for providing a wide field of view. An HMD that provides a wide field of view and high resolution has a large size and a heavy weight. In addition, since the constituent devices are complicated, and a high-level optical technology is necessary, the price of such an HMD is very high.

A general HMD includes a lens that is used for shortening the focal distance on the inside thereof. As illustrated in FIG. 1, in an optical system that uses a single lens 2, a distance (focal distance a) from a display unit 1 to the lens 2 and a distance b between the lens and an eyeball 10 need to be secured to some degree. The reason for this is that a lens having a short focal distance forms an image with a high magnification ratio, whereby the aberration is very high. In order to reduce the aberration, although a lens such as an LEEP has been devised, a distance of about ten and several cm from the display unit 1 needs to be secured due to the limitation of the magnification ratio. Accordingly, the volume of the HMD is very large, and it is inconvenient to wear the HMD. In order to wear such an HMD, a holding unit of a large volume is necessary for holding the HMD device on the head. Therefore, a user may wear the HMD only in a particular situation, and accordingly, it is inappropriate for a general user to use the HMD in everyday life.

In addition, generally, the price of a lens that is used in the HMD is high. In order to realize a short focal point and a wide field of view, a high-level technology is required, and accordingly, the price of the HMD is very high. In addition, in a wide-angle short-focal point lens used in the HMD, there is a difference between the magnification ratios of a center portion and an edge portion, whereby the distortion of a video occurs. Due to such distortion, a user experiences a sense of difference and dizziness. Accordingly, it is difficult to implement an HMD that supports a wide field of view. In other words, a general HMD has a problem in that a wide field of view may not be secured with a minimal volume and a minimal weight.

SUMMARY

According to an aspect of the present disclosure, an HMD having a small size and a light weight may be realized.

According to another aspect of the present disclosure, an HMD having a wide field of view may be realized at low cost.

According to an aspect of the present disclosure, there is provided a head mounted display including: a display unit displaying a content; and a first lens unit configured by a set of lens elements that refract the content displayed on the display unit in an eyeball direction.

According to another aspect of the present disclosure, the head mounted display is provided, wherein the lens elements respectively may have a prism shape.

According to another aspect of the present disclosure, the head mounted display is provided, wherein surfaces of the lens elements that face the eyeball respectively may have a lens shape.

According to another aspect of the present disclosure, the head mounted display is provided, wherein surfaces of the lens elements that face the eyeball respectively may be hemispherical faces.

According to another aspect of the present disclosure, the head mounted display is provided, wherein the first lens unit may have a concave shape toward the eyeball as a whole.

According to another aspect of the present disclosure, the head mounted display is provided, wherein a content transforming unit transforming the content to be displayed on the display unit to a content that is acquired by applying refraction to the content in a direction opposite to the direction of the refraction of the first lens unit may be further included.

According to another aspect of the present disclosure, the head mounted display is provided, wherein a second lens unit configured by a set of lens elements refracting light of an external image based on optical characteristics that are opposite to the characteristics of the first lens unit may be further included, and the display unit may be a transparent display.

According to another aspect of the present disclosure, there is provided a lens including a set of lenses refracting a content in an eyeball direction, wherein the lens elements respectively have a prism shape and have surfaces toward the eyeball that are hemispherical faces.

According to another aspect of the present disclosure, there is provided a method of displaying a content of a head mounted display, including: displaying a content on a display unit; and distorting the content displayed on the display unit through a first lens unit configured by a set of lens elements refracting the content in an eyeball direction.

According to still another aspect of the present disclosure, the method of displaying a content of a head mounted display is provided, wherein the displaying of a content on a display unit may further include transforming the content to be displayed on the display unit to a content that is acquired by applying refraction to the content in a direction opposite to the direction of the refraction of the first lens unit.

According to still another aspect of the present disclosure, the method of displaying a content of a head mounted display is provided, wherein the transforming of the content may further include distorting light of an external image through a second lens unit configured by a set of lens elements refracting the light based on optical characteristics that are opposite to the optical characteristics of the first lens unit.

According to an aspect of the present disclosure, an advantage of realizing a light-weight HMD of which the volume is minimized is acquired.

According to another aspect of the present disclosure, an advantage of realizing an HMD having a wide field of view at low cost is acquired.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 1:
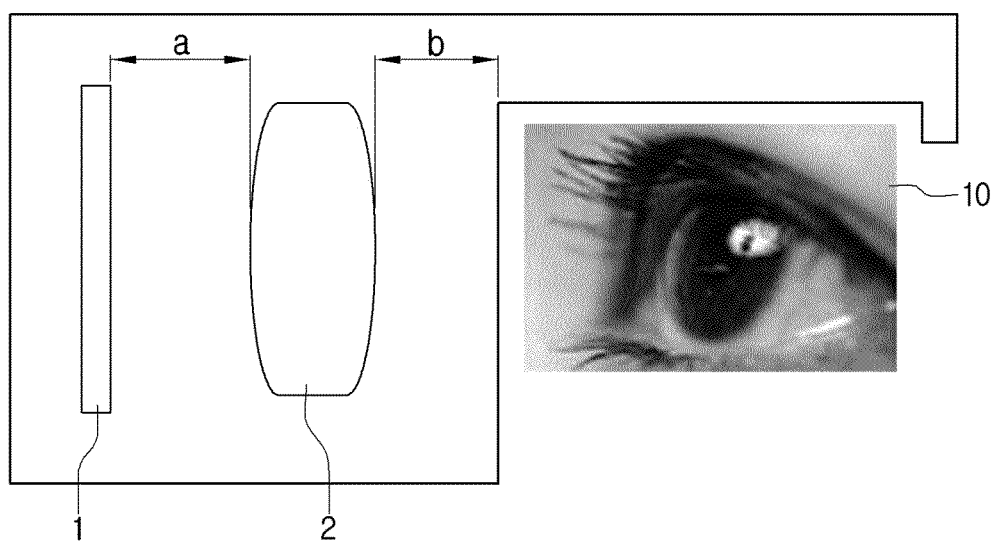
FIG. 1 is a diagram that illustrates the structure of a general HMD.
Figure 2A:
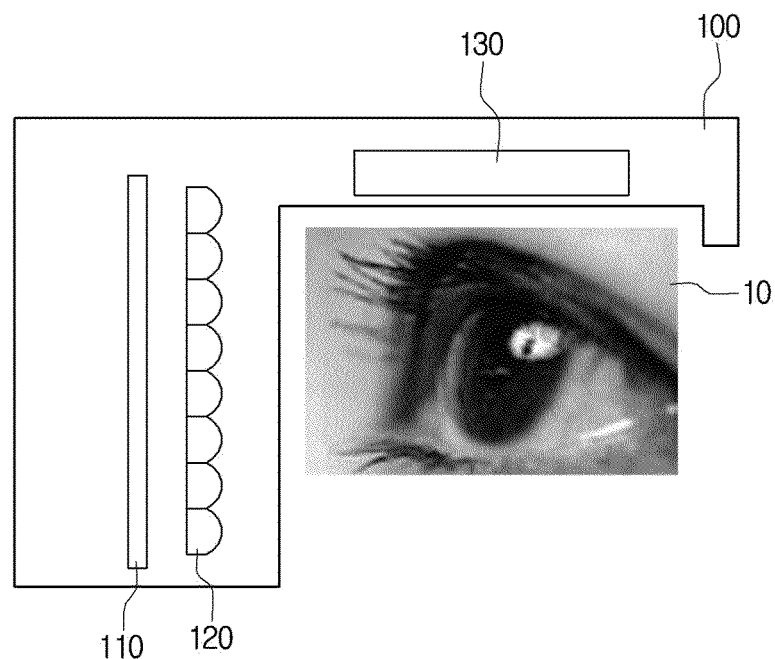
FIG. 2A is a diagram that illustrates a first internal structure of an HMD according to an embodiment of the present disclosure.

FIG. 2A is a diagram that illustrates a first internal structure of an HMD according to an embodiment of the present disclosure. The HMD 100 may include a display unit 110, a first lens unit 120, and a content transforming unit 130. Although not illustrated in the figure, the HMD 100 may further include a content reception unit.

By displaying an image that is input from an external input device such as a video device, a TV set, or a computer, the HMD 100 provides the same effect as that of a case where an image is seen with a large screen being disposed at a predetermined distance while magnifying the image output to the display unit 110 using the first lens unit 120 and allowing a resultant virtual image to be seen by the eyes.

The display unit 110 serves to output an image that is output from an external input device such as a video device, a TV set, or a computer. The display unit 110 may be a liquid crystal display (LCD), a plasma display panel (PDP), or a projector display or may be a three-dimensional display using autostereography such as a shutter glass type, a lenticular type, or a parallax barrier type or hologram. In addition, a light emitting diode (LED), an organic light emitting display (OLED), a light emitting polymer (LEP), an electro-luminescence element (EL element), a field emission display (FED), a polymer light emitting display (PLED), or the like may be applied thereto. Depending on the embodiment, the display unit 110 may be a transparent display. Through the transparent display, in addition to a content displayed on the display unit 110, a background image that may be recognized by naked eyes may be checked together. This may be used for using an augmented reality technology.

The first lens unit 120 serves to magnify an image that is output from the display unit 110. In other words, the first lens unit 120 serves to generate a virtual image by shortening a focal distance inside the HMD. As the material of the first lens unit 120, optical glass is commonly used. While the optical glass is largely classified into crown glass and flint glass, a lens having a large diameter of which the aberration is low is produced by using glass that contains barium, phosphoric acid, fluorine, or the like (having low resolving power relative to a high refractive index).

Figure 3:
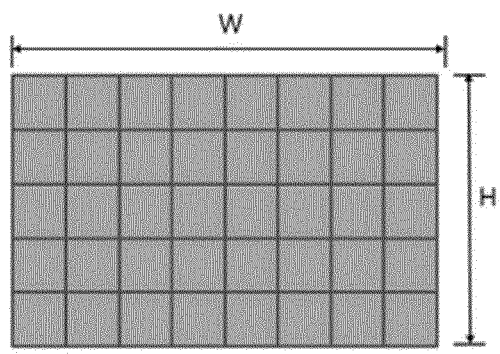
FIG. 3 is a diagram that illustrates an example of a first lens unit according to an embodiment of the present disclosure.

By referring to FIG. 3 together, the first lens unit 120 may include a set of lens elements that refract light in the eyeball direction. The set of lens elements may be arranged being connected to each other horizontally and vertically. The width W and the height H of the first lens unit 120 may be determined in accordance with the size of the display unit 110.

Figure 4:
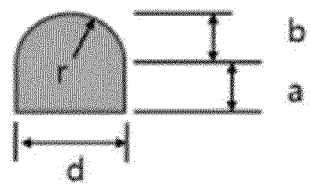
FIG. 4 is a diagram that illustrates an example of lens elements according to an embodiment of the present disclosure.

Each of the set of lens elements may have a prism shape. In an embodiment, the prism shape of each lens element may be a regular N-angular prism. In such a case, the inner angle of the regular N-angular prism is a submultiple of 360 degrees, so that an empty space is not generated between the regular N-angle prism shape. For example, six lens elements in the case of a triangular prism, four lens elements in the case of a square pillar, and three lens elements in the case of hexagonal prism meet at one apex, so that there is no empty space. As illustrated in FIG. 3, the first lens unit 120 is formed by using lens elements each having a square pillar shape. Each lens element may have a lens-shaped surface that faces the eyeball. Described with reference to FIG. 4, the surface facing the eyeball may be a hemispherical face. More specifically, it may be configured such that the surface facing the eyeball is a hemispherical face b having a radius of r, and the height a of the pillar other than the hemispherical face b is as low as can be. The reason for this is that, as the height a of the pillar is small, video distortion in the lens element arranged on the edge decreases.

Figure 5:
FIG. 5 is a diagram that illustrates an example of practical implementation of lens elements according to an embodiment of the present disclosure.
Figure 6:
FIG. 6 is a diagram that illustrates glasses implemented by using the first lens unit according to an embodiment of the present disclosure.

Through the lens elements, the first lens unit 120 may form an image of a short-distance focus. Accordingly, the display unit 110 may be positioned to be very close to the first lens unit 120, whereby the volume of the HMD 100 markedly decreases. In addition, the first lens unit 120 that is configured by the lens elements has an advantage that a lens outer portion at which the aberration is high is removed. FIG. 5 is a diagram that illustrates practical implementation of the lens unit that is configured by lens elements according to an embodiment of the present disclosure. FIG. 6 is a diagram that illustrates glasses implemented by using the first lens unit 120 according to an embodiment of the present disclosure. In the glasses illustrated in FIG. 6, electronic elements such as the display unit 110 and the content transforming unit 130 are omitted, and the glasses may be used only for checking the functionality of the first lens unit 120.

In an embodiment, the first lens unit 120 may have a concave shape toward the eyeball as a whole. The reason for this is that, as a portion is located farther from the longitudinal axis of the first lens unit 120, the probability of the occurrence of aberration at the portion increases, and accordingly, an error due to the aberration is set so as to be minimized by maintaining a concave shape as a whole.

Figure 7A:
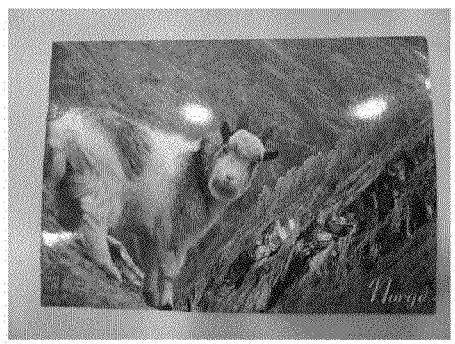
FIG. 7A is a diagram that illustrates a content recognized by a user when the first lens unit according to an embodiment of the present disclosure is not used.
Figure 7B:
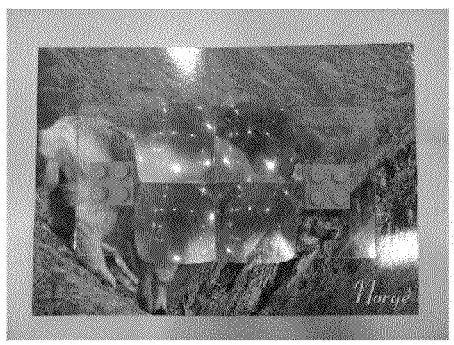
FIG. 7B is a diagram that illustrates a content recognized by a user when the first lens unit according to an embodiment of the present disclosure is used.

The content transforming unit 130 serves to transform the content to be display on the display unit 110 into a content that is acquired by applying refraction to the content in a direction opposite to that of the refraction of the first lens unit 120. FIG. 7A is a diagram that illustrates a content recognized by a user when the first lens unit according to an embodiment of the present disclosure is not used, and FIG. 7B is a diagram that illustrates a content recognized by a user when the first lens unit 120 according to an embodiment of the present disclosure is used. In other words, by using the first lens unit 120, each lens element forms an individual image, and accordingly, when the images are directly seen by naked eyes, the images are seen to be separate for each lens. In addition, the separated images of the lens elements are not seen as original contents but seen to be bent due to image distortion phenomena according to the multiplication ratios. In addition, the content transforming unit 130 according to an embodiment may provide a stereoscopic effect (3D effect) by individually processing a left-eye image and a right-eye image of a user using the HMD 100.

Figure 8A:
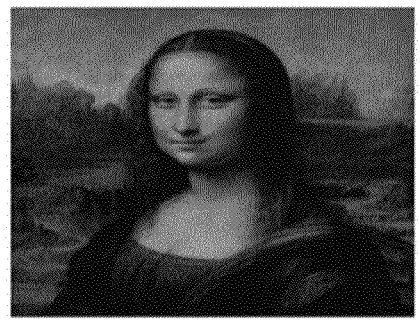
FIG. 8A is a diagram that illustrates a content recognized by a user when the first lens unit according to an embodiment of the present disclosure is not used.
Figure 8B:
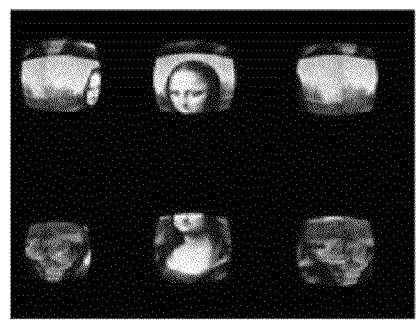
FIG. 8B is diagram that illustrates a content corrected for using the first lens unit according to an embodiment of the present disclosure.
Figure 8C:
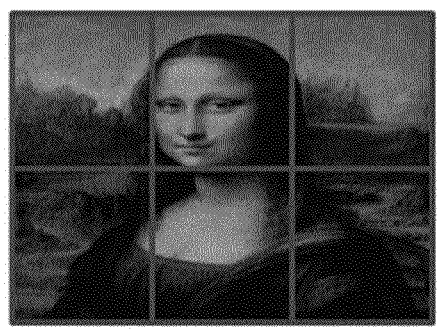
FIG. 8C is a diagram that illustrates a content recognized by a user when a corrected screen illustrated in FIG. 8C is seen by using the first lens unit according to an embodiment of the present disclosure.

FIG. 8A is a diagram that illustrates a content recognized by a user when the first lens unit 120 according to an embodiment of the present disclosure is not used, and FIG. 8B is diagram that illustrates a content corrected for using the first lens unit 120 according to an embodiment of the present disclosure. In order for the content recognized by the user through the first lens unit 120 to have a form illustrated in FIG. 8A, the content needs to be transformed by applying refraction in a direction opposite to that of the refraction of the first lens unit 120 thereto. In other words, as illustrated in FIG. 8B, the content is divided in correspondence with each lens element and then is transformed by applying refraction in the direction opposite to that of the refraction of the first lens unit 120 thereto. FIG. 8C is a diagram that illustrates a content recognized by a user when a corrected screen illustrated in FIG. 8B is seen by using the first lens unit 120 according to an embodiment of the present disclosure, and, differently from the content illustrated in FIG. 7B, the content may be recognized to be the same as that illustrated in FIG. 8A.

The content reception unit (not illustrated in the figure) serves to receive a content from an external object or a storage unit (not illustrated in the figure) disposed inside the HMD 100. Although the content described in an embodiment of the present disclosure is a multimedia content that includes an image, a video, and the like as a target, the content is not limited to the contents mentioned in the description of the present disclosure. The represented content may be the whole or a part of a content depending on the type of the content. For example, in a case where the content is an image, the content may represent the whole image screen or only a part of the image. In another embodiment, in a case where the content is a video, a captured scene of a representative screen may be used as a part of the content, or a video that is currently reproduced may be represented. The content that is received by the content reception unit (not illustrated in the figure) may be a content (3D content) in which images of a left-eye and a right-eye of a user using the HMD 100 have been individually processed.

Figure 2B:
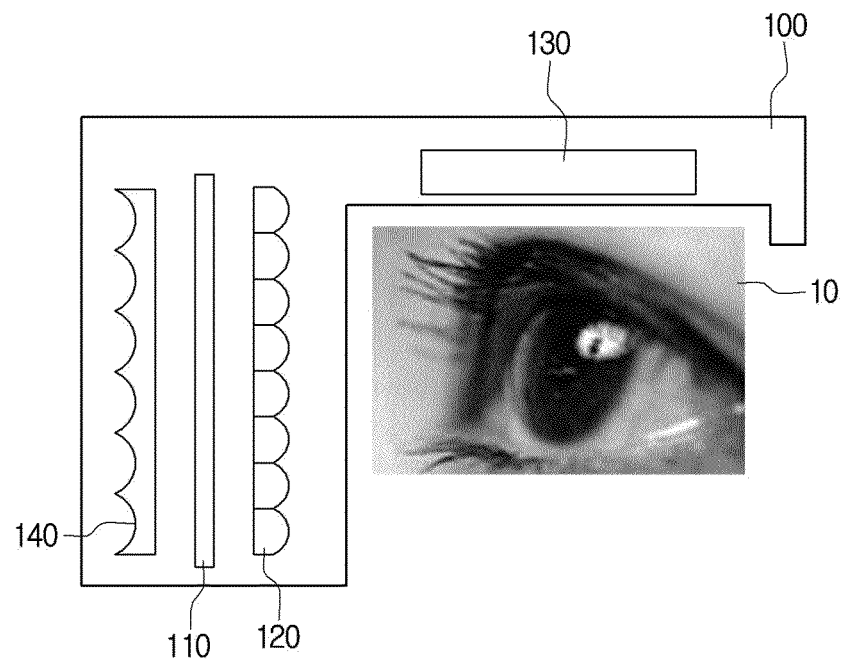
FIG. 2B is a diagram that illustrates a second internal structure of an HMD according to an embodiment of the present disclosure.

FIG. 2B is a diagram that illustrates a second internal structure of an HMD according to an embodiment of the present disclosure. When compared with the structure illustrated in FIG. 2A, the HMD further includes a second lens unit 140.

The second lens unit 140 is configured by a set of lens elements that refract light based on optical characteristics opposite to those of the first lens unit 120. In an embodiment, the second lens unit 140, as illustrated in FIG. 2B, may have a shape that is opposite to the shape of the first lens unit 120. While the surfaces of the lens elements of the first lens unit 120 have a hemispherical face facing the eyeball, the lens elements of the second lens unit 140 may have a reversed hemispherical face facing a direction opposite to the direction of the eyeball. In a case where the display unit 110 is a transparent display, in addition to a content supplied through the HMD 100, a background image other that the content displayed on the display unit 110 that may be recognized by an actual user with naked eyes may be checked together. This may be used for using an augmented reality technology.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A head mounted display comprising:
 a display unit configured to display a content;
 a first lens unit configured by a set of lens elements configured to refract the content displayed on the display unit onto an eyeball; and
 a second lens unit configured by a set of lens elements configured to refract light of an external image based on optical characteristics that are opposite to optical characteristics of the first lens unit;
 wherein each of the lens elements of the first lens unit has a convex surface facing toward the eyeball; and
 each of the lens elements of the second lens unit has a concave surface facing away from the eyeball.

2. The head mounted display according to claim 1, wherein the lens elements of the first lens unit respectively have a prism shape.

3. The head mounted display according to claim 2, wherein surfaces of the lens elements of the first lens unit facing the eyeball respectively have a lens shape.

4. The head mounted display according to claim 3, wherein the surfaces of the lens elements of the first lens unit facing the eyeball respectively are hemispherical faces.

5. The head mounted display according to claim 1, wherein the first lens unit has a concave shape toward the eyeball as a whole.

6. The head mounted display according to claim 1, further comprising a content unit configured to transform the content to be displayed on the display unit to a content acquired by applying refraction to the content in a direction opposite to a direction of the refraction of the first lens unit.

7. The head mounted display according to claim 1, wherein the display unit is a transparent display.

8. A lens comprising:
 a first lens unit configured by a set of lenses configured to refract a content in an eyeball direction; and
 a second lens unit configured by a set of lens elements configured to refract light of an external image:
 wherein the lens elements of the first lens unit respectively have a prism shape and have surfaces facing toward the eyeball that are hemispherical faces; and
 the lens elements of the second lens unit respectively have a prism shape and have surfaces facing away from the eyeball that are reversed hemispherical faces.

9. A method of displaying a content of a head mounted display, the method comprising:
 displaying a content on a display unit; and
 distorting the content displayed on the display unit through a first lens unit configured by a set of lens elements configured to refract the content onto an eyeball; and
 distorting light of an external image through a second lens unit configured by a set of lens elements configured to refract the light of the external image based on optical characteristics that are opposite to optical characteristics of the first lens unit;
 wherein each of the lens elements of the first lens unit has a convex surface facing toward the eyeball; and
 each of the lens elements of the second lens unit has a concave surface facing away from the eyeball.

* * * * *